United States Patent [19]
Lewis

[11] 3,802,195
[45] Apr. 9, 1974

[54] CONCENTRIC BRAKE BOOSTER WITH FAILSAFE POWER SUPPLY

[75] Inventor: Richard L. Lewis, South Bend, Ind.

[73] Assignee: The Bendix Corporation, South Bend, Ind.

[22] Filed: Sept. 27, 1972

[21] Appl. No.: 292,585

[52] U.S. Cl. .................. 60/403, 60/404, 60/413, 60/582
[51] Int. Cl. ............................................ F15b 20/00
[58] Field of Search ............ 60/403, 404, 405, 582, 60/413

[56] References Cited
UNITED STATES PATENTS
3,251,187  5/1966  Mossback .................... 60/582 X
3,353,451  11/1967  Garrison et al. ............... 60/404 X

*Primary Examiner*—Edgar W. Geoghegan
*Attorney, Agent, or Firm*—Ken C. Decker; William N. Antonis

[57] ABSTRACT

A hydraulic brake booster is disclosed which is provided with an auxiliary fluid pressure source for operation of the booster upon failure of the vehicle's primary pressure source. The hydraulic brake booster is of the so-called concentric type, in which the control valve is mounted concentrically within the boost piston and normally controls fluid communication between the primary pressure source and the booster chamber to shift the boost piston to effect a brake application. A normally closed valve controls communication between the auxiliary pressure source and the pressure chamber. A linkage is provided to connect the control valve with the valve controlling communication from the auxiliary pressure source so that, upon overtravel of the control valve indicating a failure of the primary pressure source, the linkage actuates the auxiliary pressure source to communicate fluid from the latter into the booster pressure chamber.

11 Claims, 2 Drawing Figures

PATENTED APR 9 1974　　3,802,195

CONCENTRIC BRAKE BOOSTER WITH FAILSAFE POWER SUPPLY

BACKGROUND OF THE INVENTION

This invention relates to a hydraulic brake booster.

Hydraulic brake boosters are expected to gradually replace existing vacuum-operated units within the next few years. While hydraulic brake boosters possess many advantages over the vacuum type units, one disadvantage inherent in most hydraulically actuated brake boosters is that, upon failure of the vehicle's power steering pump which supplies pressurized fluid to the booster, all power assist is immediately lost. This deficiency can be extremely critical in the situation, for example, when the vehicle is descending a steep grade and the vehicle's engine suddenly dies thereby terminating operation of the power steering pump. In my U.S. Pat. No. 3,638,528, owned by the assignee of the present invention, I disclose a brake booster which is provided with a secondary pressure source which includes an accumulator which stores pressurized fluid produced by the vehicle's power steering pump when the latter operates normally, for use upon a failure of the power steering pump so that the power assist is not immediately lost. However, the device disclosed in the aforementioned patent is operable only with brake boosters of the so-called "parallel" design, in which the control valve which controls communication of pressurized fluid into the booster pressure chamber is mounted parallel with the boost piston. However, another hydraulic brake booster design mounts the control valve concentrically within the boost piston, so that the control valve shifts relative to the piston to initially communicate fluid to the booster pressure chamber, but shifts with the piston as the latter moves in response to the pressure in the pressure chamber. Therefore, it is desirable to provide an emergency power source for the brake boosters of the so-called "concentric" design.

SUMMARY OF THE INVENTION

Therefore, an important object of my invention is to provide a subsidiary or auxiliary pressure source for a hydraulic brake booster of the concentric design, to enable a power assist to be provided to the vehicle operator even after failure of the vehicle's power steering pump.

Another important object of my invention is to provide a linkage means responsive to overtravel of the spool valve mounted within the piston of a concentric brake booster to actuate the subsidiary or auxiliary fluid pressure source upon failure of the vehicle's primary pressure source.

DETAILED DESCRIPTION

Figure 2:
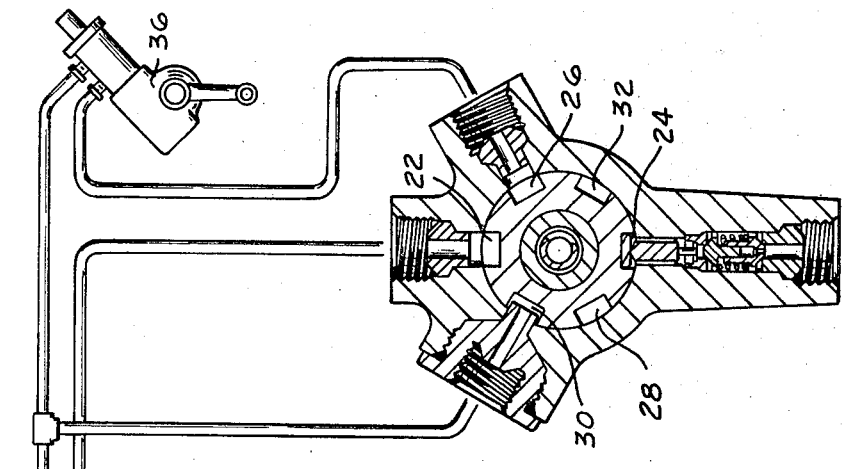
FIG. 2 is a cross-sectional view taken substantially along lines 2—2 of FIG. 1, but which also illustrates schematically the vehicle's power steering pump and power steering gear.

Referring now to the drawings, a hydraulic brake booster generally indicated by the numeral 10 includes a housing 12 defining a bore 14, therewithin. A power piston 16 is slidably mounted in the bore 14, and one end of the power piston 16 cooperates with the corresponding end of bore 14 to define a pressure chamber 18 therebetween. A rod 20 connects the other end of the piston 16 with a standard automotive master cylinder (not shown) mounted to the left of the housing 12 for actuating the latter upon movement of the piston 16 to the left viewing FIG. 1.

The outer circumferential surface of the piston 16 is provided with a first set of diametrically opposed grooves 22, 24; a second set of diametrically opposed grooves 26, 28; and a third set of diametrically opposed grooves 30, 32. Grooves 22 and 24 are communicated with the outlet or high pressure side of the vehicle's power steering pump 34; grooves 26 and 28 are communicated with the inlet of the vehicle's power steering gear 36; and grooves 30 and 32 are communicated to the inlet or low pressure side of the pump 34, as is also the outlet of the gear 36.

Housing 12 is further provided with a transverse bore 28 which communicates with the groove 24. The transverse bore 38 communicates the groove 24 with an accumulator or other fluid pressure storage device generally indicated by the numeral 40. The accumulator 40 may be made pursuant to any well known design, such as the design closed in U.S. Pat. No. 3,282,786 owned by the assignee of the present invention and incorporated herein by reference. A check valve generally indicated by the numeral 42 is mounted within the bore 38 and includes a valve member 44 which is urged into sealing engagement with a valve seat 46 by a spring 48 to prevent fluid communication from the accumulator 40 into the groove 24, but to permit communication in the reverse direction. A plunger 50 is also slidably mounted in the bore 38 for movement radially with respect to the bore 14 and projects into the groove 24. When plunger 50 is shifted in the bore 38, the end of the plunger 50 urges the valve member 44 away from the valve seat 46 to permit fluid communication from the accumulator 40 into the groove 24, as will be more fully described hereinafter. Flats are provided around the periphery of the plunger 50 to permit fluid communication past the plunger 50 between the bore 38 and the groove 24. An elongated element or rod 52 is mounted in the groove 24 and extends across substantially the entire axial length of the latter so that, as the piston is shifted, the element 52 will shift with the piston. The end of the plunger 50 slidably engages the element 52 so that the latter may shift relative to the plunger in an axial direction, but movement of the element 52 radially with respect to the bore 14 urges the plunger 50 downwardly in the bore 38. Another plunger 54 extends radially through the wall of the piston 16 between a bore 56 defined within the piston 16 and the groove 24. One end of the plunger 54 engages the element 52, so that radial movement of the plunger 54 also shifts the element 52 radially with respect to the piston 16 to actuate the plunger 50. Flats are also provided on the plunger 54 to communicate the bore 56 with the groove 24. Together, the plungers 50 and 54 and the element 52, define linkage means generally indicated by the numeral 58, the purpose of which will be further described hereinafter.

A spool valve generally indicated by the numeral 60 is slidably mounted in the bore 56 and is provided with grooves 62, 64 and lands 66, 67, and 68 which cooperate with corresponding grooves 70, 72 and lands 74, 76 on the wall of the bore 56 to control communication into the pressure chamber 18. Groove 70 is communicated to the groove 24 and therefore to the outlet or high pressure side of the pump 34. Similarly, the groove 62 is communicated with the grooves 26 and 28 and therefore to the inlet of the power steering gear 36. Groove 72 is communicated to the grooves 30 and 32 and therefore to the inlet or low pressure side of the pump 34. Groove 64 is communicated into the pressure chamber 18 through a passage 78. A camming surface 80 is provided on one end of a groove 81 defined between the lands 66 and 67 of the spool valve 60 so that, if the latter is shifted a sufficient distance, engagement of the camming surface 80 with the edge of the plunger 54 will shift the latter radially with respect to the piston 16, thereby also shifting the element 52 and the other plunger 50 in a manner described hereinabove. The spool valve 60 is shifted by an input rod generally indicated by the numeral 82, one end of which (not shown) is connected to the usual brake pedal mounted in the vehicle operator's compartment, the other end of which engages the spool valve 60 for shifting the latter. A spring 84 urges the spool valve 60, and therefore the input rod 82, to the right viewing FIG. 1, so that abutments 86 carried by the input rod 82 are urged into engagement with corresponding abutments 88 carried by the piston 16, thereby defining the released position of the spool valve 60. The piston 16, and therefore the spool valve 60 carried within the piston is urged to the right viewing FIG. 1 by brake return spring 90, so that the right hand end of the piston 16 is normally urged into engagement with the end of the bore 14, thereby defining the brake released position of the piston 16.

MODE OF OPERATION

Figure 1:
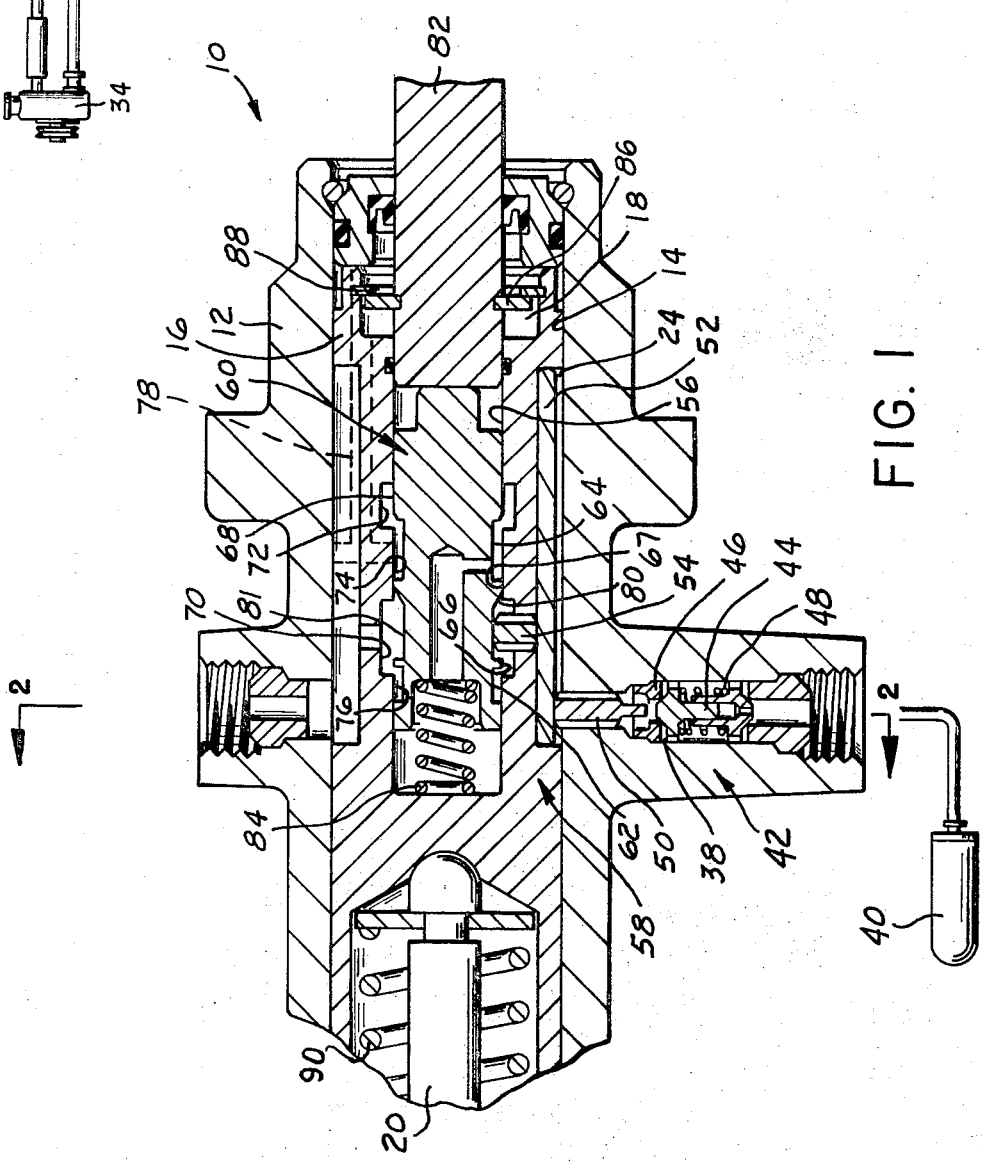
FIG. 1 is a longitudinal cross-sectional view of a concentric brake booster made pursuant to the teachings of my present invention.

The various components of the brake booster 10 are illustrated in FIGS. 1 and 2 in the positions which they assume when the brakes of the vehicle are released. In this position, the groove 70 is communicated to the groove 76 so that substantially all the fluid flowing into the booster from the pump 34 is immediately communicated to the gear 36. Similarly, communication is permitted between the pressure chamber 18 and the low pressure side of the pump 34 through the passage 78, grooves 74 and 72, and the slots 30 and 32. When a brake application is effected, the spool valve 60 is urged to the left viewing FIG. 1, to thereby lap land 68 with land 74 to terminate fluid communication from the pressure chamber 18 to the inlet or low pressure side of the pump 34. At the same time, land 67 moves away from the land 74 to communicate the groove 60 into the groove 64 and therefore into the pressure chamber 18 through the passage 78. Also, at about the same time, the orifice defined between the end of the land 66 and the end of the land 76 is appreciably reduced, to thereby restrict fluid communication between the groove 70 and the groove 62, thereby developing a higher fluid pressure level in the groove 70, which is communicated into the pressure chamber 18 as described hereinabove. Pressure in the chamber 18 acting upon the right hand end of the piston 16 urges the latter to the left viewing FIG. 1, and since this movement is transmitted to the aforementioned master cylinder (not shown) by the output rod 20, actuation of the piston 16 effects a brake application in the normal manner.

It will be noted that the high pressure fluid developed in the groove 70 due to the restriction of communication between the groove 70 and the groove 62 is also communicated into the accumulator 40, since transverse bore 38 is also communicated with the groove 70 through the slot 24. The check valve 42, of course, permits fluid communication from the groove 24 into the accumulator 40, but prevents communication in the reverse direction. High pressure fluid will also be communicated into the accumulator 40 even when the brakes of the vehicle are released if the vehicle's power steering gear 36 is operated, thereby developing back pressure in the vehicle hydraulic system. Therefore, a fully charged accumulator is almost assured at all times while the vehicle's power steering pump 34 is operating normally.

When a malfunction causes the power steering pump 34 to terminate its high pressure output, such as would occur, for example, when the vehicle's engine dies, the vehicle operator, effecting a brake application, shifts the spool valve 60 a small additional distance to the left viewing FIG. 1. As the spool valve is shifted, the camming surface 80 is brought into engagement with the end of the plunger 54, and thereafer the plunger 54 rides up the camming surface 80, so that the plunger 54 is shifted radially outwardly with respect to the piston 16. This radial outward movement of the plunger 54 is transmitted to the plunger 50 through the element 52, thereby causing the plunger 50 to urge the valve element 44 away from the valve seat 46, to permit the fluid pressure content of the accumulator 40 to be communicated into the pressure chamber 18 through the grooves 70 and 64, and the passage 78. The fluid pressure communicated into the pressure chamber 18 from the accumulator 40 then effects the brake application in the normal manner by shifting the piston 16 as described above. It will be noted that, when the piston 16 is shifted during a brake application powered either by the accumulator 40 or by the primary fluid pressure pump 34, the element 52 may shift axially with respect to the plunger 50 throughout the entire axial movement of the piston 16. However, if at any time during movement of the piston 16, the fluid pressure content of the accumulator 40 is needed, additional shifting of the valve 60 actuates the linkage 58 to communicate the needed fluid pressure content of the accumulator 40 into the pressure chamber 18.

I claim:

1. In a hydraulic brake booster for a vehicle hydraulic system having primary and secondary pressure sources:

a housing member defining a bore therewithin;
a piston member slidably mounted in said bore and cooperating with one end of the latter to define a pressure chamber therebetween;
first valve means carried by said piston member, said first valve means being shiftable relative to said piston member from a first position venting said pressure chamber to a second postion, said first valve means communicating successively higher fluid pressure levels into said pressure chamber from said primary pressure source as said first valve means is shifted toward said second position to slide said piston member toward the other end of said bore, said first valve means moving conjointly with said piston member as the latter slides toward said other end of the bore;

second valve means carried by said housing member for controlling fluid communication from said secondary pressure source into said pressure chamber; and linkage means operatively connecting said first valve means with the second valve means throughout the entire range of sliding movement of the piston member to actuate said second valve means upon movement of said first valve means past said second position, said linkage means permitting said first valve means to move relative to the housing member as said first valve means moves conjointly with said piston member.

2. The invention of claim 1:
said secondary fluid pressure source including means for storing fluid under pressure.

3. The invention of claim 2:
said primary fluid pressure source including a pump driven by the engine of said vehicle;
said housing having an inlet communicated to the high pressure outlet of said pump and an outlet communicated to the low pressure inlet of said pump;
the high pressure outlet of said pump being communicated to said fluid storage means for charging the latter with pressurized fluid during normal operation of said pump; and
means permitting fluid communication from the outlet of the pump into said fluid storage means but preventing communication in the reverse direction.

4. The invention of claim 1:
said linkage means including a first plunger carried by said piston member and movable by movement of said first valve means past said second position, a second plunger movable to open said second valve means, and an element interconnecting said plungers to transmit movement of said first plunger to said second plunger, said element permitting relative movement of said first plunger with respect to said second plunger in a direction parallel to the axis of said bore.

5. The invention of claim 4:
said first plunger extending through the wall of said piston in a generally radial direction;
said first valve means including means for moving said plunger in said generally radial direction upon movement of said first valve means past the second position;
said second plunger moving in a generally radial direction to open said second valve means;
said element permitting said first plunger to move axially with respect to said second plunger, but transmitting radial movement of said first plunger to move said second plunger in a generally radial direction.

6. The invention of claim 5:
said element being carried by said piston member for movement therewith.

7. The invention of claim 5:
said first fluid pressure source being a pump driven by the engine of the vehicle;
said second fluid pressure source including means for storing fluid under pressure, said last-mentioned means being charged by the fluid pressure output of said pump during normal operation of the latter.

8. The invention of claim 1:
said housing having an inlet port communicated to said first fluid pressure source and an outlet port, said first valve means controlling fluid communication between the inlet port, the outlet port, and the pressure chamber;
said piston member having first axially extending slot means to communicate said inlet port with said valve means throughout the entire range of axial movement of said piston member and second axially extending slot means communicating said outlet port to said first valve means throughout the entire range of axial movement of said piston member;
said linkage means extending through one of said slot means.

9. The invention of claim 8:
said linkage means including a first plunger carried by said piston member and movable in response to movement of the first valve means past the second position, a second plunger slidably mounted in said housing and movable to open said second valve means, and an element carried in one of said slot means to transmit motion of said first plunger to said second plunger, said element sliding relative to said second plunger during axial movement of said piston member.

10. The invention of claim 9:
said element being carried in said first slot means, said second pressure source communicating fluid into said first slot means when said second valve means is opened.

11. The invention of claim 1:
said linkage means including a first plunger carried by said piston member and movable in response to movement of the first valve means past the second position, a second plunger slidably mounted in said housing and movable to open said second valve means, and an element carried by said piston member to transmit motion of said first plunger to said second plunger during axial movement of said piston member.

* * * * *